United States Patent [19]
Garcia et al.

[11] Patent Number: 5,397,414
[45] Date of Patent: * Mar. 14, 1995

[54] METHOD AND APPARATUS FOR MANUFACTURING PAINT ROLLER AND PRODUCT PRODUCED THEREBY

[75] Inventors: Jaime A. Garcia, Barcelona, Spain; Bruce C. Polzin, Greendale; Kenneth L. Shehow, Milwaukee, both of Wis.

[73] Assignee: EZ Painter Corporation, St. Francis, Wis.

[*] Notice: The portion of the term of this patent subsequent to Dec. 28, 2010 has been disclaimed.

[21] Appl. No.: 155,316

[22] Filed: Nov. 22, 1993

Related U.S. Application Data

[63] Continuation-in-part of Ser. No. 871,889, Apr. 21, 1992, Pat. No. 5,273,604, which is a continuation of Ser. No. 489,398, Mar. 6, 1990, abandoned.

[30] Foreign Application Priority Data

Mar. 7, 1989 [ES] Spain ................................. 890081

[51] Int. Cl.⁶ .............................................. B32B 31/00
[52] U.S. Cl. ....................................... 156/187; 156/195; 156/446; 29/895; 15/230.11; 15/230.12
[58] Field of Search ............... 156/195, 187, 446, 188; 15/230.11, 230.12; 29/895

[56] References Cited

U.S. PATENT DOCUMENTS

| | | | |
|---|---|---|---|
| 3,366,719 | 1/1968 | Leuders | 264/47 X |
| 4,038,731 | 8/1977 | Hill | 29/132 X |
| 4,078,957 | 3/1978 | Bradt | 156/173 X |
| 4,121,962 | 10/1978 | Hopkins | 156/272 X |
| 4,191,792 | 3/1980 | Janssen | 427/260 X |
| 4,192,697 | 3/1980 | Parker | 156/188 X |
| 4,211,595 | 7/1980 | Samour | 156/187 X |
| 4,434,521 | 3/1984 | Martin | 15/230.11 X |
| 4,544,426 | 10/1985 | Stockman | 156/73.6 X |
| 4,692,975 | 9/1987 | Garcia | 29/120 X |
| 4,937,909 | 7/1990 | Georgiou | 15/230.11 X |
| 5,137,595 | 8/1992 | Garcia | 156/425 X |
| 5,195,242 | 3/1993 | Sekar | 156/187 X |
| 5,273,604 | 12/1993 | Garcia | 156/187 |

FOREIGN PATENT DOCUMENTS 61-15816 4/1986 Japan.

Primary Examiner—David A. Simmons
Assistant Examiner—Charles Rainwater
Attorney, Agent, or Firm—Baker & McKenzie

[57] ABSTRACT

The invention consists of applying a thermosetting adhesive in a molten state to an area where a strip of pile fabric is wound onto a plastic tube which is mounted over a rotating roller. The molten thermosetting adhesive is applied by a nozzle connected to a reservoir where the thermosetting adhesive is heated. After application, the adhesive, the strip of pile fabric and the plastic tube are joined together, forming a structurally integral paint roller body.

4 Claims, 1 Drawing Sheet

METHOD AND APPARATUS FOR MANUFACTURING PAINT ROLLER AND PRODUCT PRODUCED THEREBY

This application is a continuation-in-part of U.S. patent application Ser. No. 07/871,889, filed on Apr. 21, 1992, now U.S. Pat. No. 5,273,604, which is a continuation of U.S. patent application Ser. No. 07/489,398, filed on Mar. 6, 1990, now abandoned, which claims the benefit of the filing date pursuant to 35 U.S.C. § 119 of the Spanish Application Serial No. 8900821, filed on Mar. 7, 1989.

FIELD OF THE INVENTION

The present invention relates generally to the manufacture of paint rollers and more specifically to an improved method of manufacturing paint rollers. More particularly, the present invention relates to a variety of adhesives suitable for adhering a thermoplastic fabric strip to a thermoplastic paint roller core.

BACKGROUND OF THE INVENTION

Currently in the manufacture of paint rollers, strips of pile fabric are used which are wound around a plastic or cardboard tube or core. More specifically, among the devices currently employed is a type of machine illustrated in Spanish Utility Model No. 293.980, which includes a rotating cylinder over which the plastic or cardboard tube is mounted, and onto which a strip of pile fabric is applied through a guide oriented obliquely and situated on and carried by a carriage which is mounted in fixed fashion over a sliding apparatus. The bonding of the plastic tube and strip of pile fabric is accomplished either by the application of adhesive material or by the use of a plastic tube which, when heated by means of gas burners, bonds to the strip of pile fabric, thereby forming a single body.

In the first case, i.e., where conventional adhesive is used as the means of bonding between the tube and strip of pile fabric, the manufacture of paint rollers presents significant problems, all resulting from the difficulty of applying the adhesive uniformly, plus the fact that very specific adhesives must be used to produce the bond between the tube and the strip of pile fabric so that, when the rollers are used, these adhesives do not separate due to the solvents contained in the paint and in the fluids used to clean the roller.

These problems considerably increase the cost of manufacturing paint rollers because the cost of the adhesives and the time needed for the adhesives to harden.

The second system mentioned above, though a significant advance in the art over what had been earlier used, does present certain problems, all resulting from the increased safety costs required by installations that use gas as a fuel source. Further, the heating of the plastic tube can produce undesirable products of combustion and high noise, both effects being potentially harmful for the operators and expensive to eliminate; all of this therefore has the result of raising the cost of the final product.

SUMMARY OF THE INVENTION

The object of the present invention is a procedure for manufacturing paint rollers of the type in which a strip of pile fabric is wound helically over a plastic tube or core, with the interposition of a thermoplastic adhesive in a molten state, with the result that the strip of pile fabric and the plastic tube form a single paint roller body.

Specifically, the thermoplastic adhesive, in a molten state, is applied onto the plastic tube in the area adjacent to the area of the winding of the strip through a nozzle connected to a reservoir where the thermoplastic adhesive is heated, which nozzle is mounted on the carriage on which the pile fabric strip applicator is also located. Suitable adhesives include polypropylene polyethylene, a mixture of polypropylene and polyethylene, any of a variety of polyamides, polyolefin based compounds, polyester based compounds, polyurethane based compounds, polyamide "hot melt" adhesives sold under the designations HB Fuller Hot Melt 6542-PEL and HL2021, Hot Melt 2167PL and other suitable adhesives compatible with a plastic tube such as a polypropylene tube in the anticipated solvents found in the paint, stain, shellac or varnish and the solvents used to clean the roller. The anticipated solvents include turpentine, mineral spirits, aliphatic compounds, ketones or aromatics in petroleum based solvents including naphtha, chlorinated hydrocarbons, alcohol based solvents, acetone, toluene and water including soapy water and ammoniated water.

Another object of the present invention is the provision of a paint roller which is structurally integral as a result of the bonding of the thermoplastic adhesive with the strip of the pile fabric and the plastic tube.

BRIEF DESCRIPTION OF THE DRAWINGS

The invention is illustrated more or less diagrammatically in the accompanying drawing wherein.

DESCRIPTION OF THE PREFERRED EMBODIMENT

Figure 1:
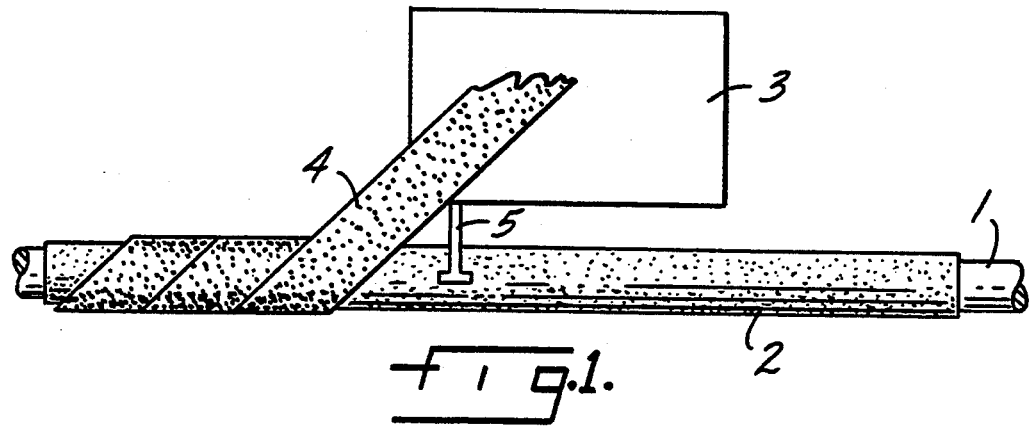
FIG. 1 is a plan view of the plastic tube mounted over the rotating roller and the strip of pile fabric being wound helically and the movable carriage on which are situated the applicator of the pile fabric strip and the nozzle for applying the thermoplastic adhesive in a molten state.

The procedure for manufacturing paint rollers that is the object of the present invention includes the use of a machine that has a rotating roller 1 on which the plastic tube 2 is mounted. The machine also has a carriage 3 which, in FIG. 1, is movable parallel to the longitudinal axis of the rotating roller. The carriage 3 includes a feed mechanism for pile fabric strip 4 to be helically wound around the plastic tube 2.

The procedure consists of a first operative phase in which the plastic tube 2 is mounted over the rotating roller 1 and a second operative phase in which the strip of pile fabric 4 is wound helically over the plastic tube 2 through the applicator located on the movable carriage 3.

The fundamental characteristics of the present procedure for the manufacture of paint rollers consists of applying a thermoplastic adhesive in a molten state onto the area of the plastic tube 2 where the strip 4 will be closely wound. It will be understood that the specific thermoplastic adhesive material applied to the junction region between the tube and fabric is not critical to the invention. However, it must be compatible with the plastic tube selected and the pile fabric in the solvents contained in the paint, stain, varnish or shellac as well as the solvents used to clean the roller if the roller is the reusable type. The thermoplastic adhesive is applied by the outlet mouth of the nozzle 5 mounted over the movable carriage 3, which nozzle 5 is connected to a reservoir where the thermoplastic adhesive is heated.

Figure 2:
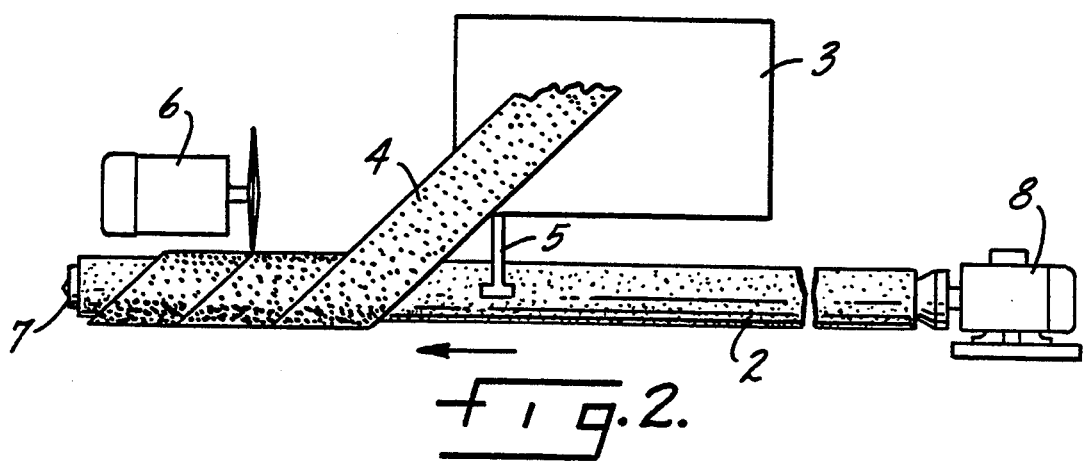
FIG. 2 is a plan view of the plastic tube mounted on a rotating roller and movable longitudinally by means of a drive unit, and wherein the strip of pile fabric is wound helically, and the fixed carriage on which the applicator of the thermoplastic adhesive in a molten state is located.
Figure 3:
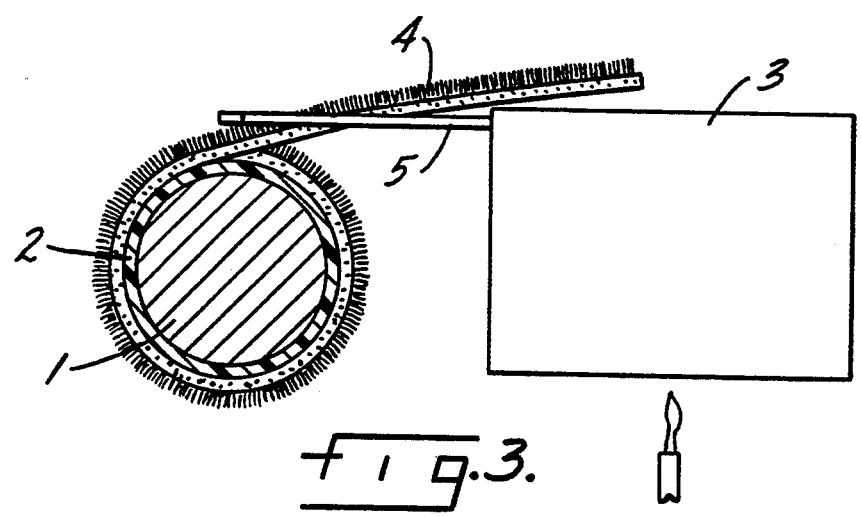
FIG. 3 is a sectional view of either of the above Figures showing a section of the roller already constructed, wherein the strip of pile fabric, the thermoplastic adhesive and the plastic tube form a single body.

In the embodiment of FIG. 2, the plastic tube 2 is mounted over a rotating roller 7. The plastic tube may be moved longitudinally by a drive unit 8, while the carriage 3 and the rotating roller 7 remains axially fixed.

In both cases, the system includes a cutter 6 which produces the roller units in a condition ready for the subsequent assembly of the handle, axis and cap. In the embodiment of FIG. 1, the cutter 6 does not move horizontally when cutting. In the embodiment of FIG. 2 it will be understood that the cutter 6 will be arranged to move in synchronism with the horizontal movement of the tube 2 when cutting.

The system produces a paint roller comprised of a structurally integral element due to the bonding produced between the plastic tube 2 and the strip of pile fabric 3, together with the interposition of the compatible thermoplastic adhesive which has been heated to a temperature capable of forming a strong bond. The exact temperature will of course vary slightly from material to material and other factors unique to a specific operation as will be readily apparent to one skilled in the art.

With this procedure, the high expenditures that must be incurred for the safety measures that are currently required when gas installations are used in the manufacture of this type of roller are avoided; also, the disagreeable products of combustion and elevated noise level which can be potentially harmful for operation are eliminated since the thermoplastic adhesive is heated in an independent reservoir that may be located at a considerable distance from the site where the rollers are manufactured.

The preferred adhesives include polypropylene, polyethylene, a mixture of polypropylene and polyethylene, one preferred mixture having a polypropylene:polyethylene ratio of about 80:20, polyamide or a mixture of polyamides, polyolefin based compounds, polyester based compounds, polyurethane based compounds, polyamide "hot melt" adhesives sold under the designations HB Fuller 6542-PEL and HL2021 and Hot Melt 2167PL as well as other suitable adhesives compatible with a plastic tube which may be fabricated from polypropylene. Alternative materials for fabricating the core include other polymeric materials including polyethylene, a mixture of polyethylene and polypropylene, polyethylene with added talc, polyester and other plastics. The adhesive must also be compatible with the plastic tube and the pile fabric in the anticipated solvents used in connection with paint. These solvents include water, water with ammonia, soapy water, mineral spirits, turpentine, aromatic compounds, aliphatic compounds, alcohols, ketones, acetone, toluene, chlorinated hydrocarbons and other solvents foreseeably used with paint, including both water and oil based paints, shellac and varnish.

Although only one preferred embodiment of the invention has been illustrated and described in connection with a plurality of adhesives, it will at once be apparent to those skilled in the art that modifications and improvements may be made within the scope of the invention. Accordingly it is intended that the scope of the invention not be limited by the foregoing exemplary description, but only by the hereafter appended claims.

We claim:

1. In a continuous method of producing a structurally integrated paint roller, the method comprising the steps of:

provising a pre-fabricated plastic paint roller core, the plastic paint roller core being pre-fabricated from a plastic selected from the group consisting of polypropylene, polyethylene, polyester, and a mixture of polyethylene and polypropylene, rotating the pre-fabricated plastic paint roller core, presenting a fabric strip to the pre-fabricated plastic paint roller core, the fabric strip having a fabric backing, providing a supply of thermoplastic adhesive which is compatible with both the pre-fabricated plastic paint roller core and the fabric backing, said thermoplastic adhesive being selected from the group consisting of polypropylene, polyethylene, a mixture of polypropylene and polyethylene having a polypropylene:polyethylene ratio of about 80:20, polyamide, polyolefin based compounds, polyester based compounds and polyurethane based compounds, heating the supply of adhesive to a temperature at which it becomes a liquid adhesive, applying a single application of the liquid adhesive directly to the rotating pre-fabricated plastic paint roller core immediately prior to the placement of the fabric strip on the pre-fabricated plastic paint roller core in an amount sufficient to securely bond the fabric strip to the pre-fabricated plastic paint roller core so as to yield a structurally integral product, and wrapping the fabric strip while the adhesive is a liquid adhesive about the pre-fabricated plastic paint roller core while the fabric strip and pre-fabricated plastic paint roller core are rotating with respect to each other.

2. In a continuous method of producing a structurally integrated paint roller, the method comprising:

providing a pre-fabricated thermoplastic paint roller core, rotating the pre-fabricated thermoplastic paint roller core, presenting a thermoplastic fabric strip to the pre-fabricated thermoplastic paint roller core, the fabric having a fabric backing, providing a supply of thermoplastic adhesive which is compatible with both the pre-fabricated thermoplastic paint roller core and the fabric backing, heating the thermoplastic adhesive to provide a hot liquid adhesive, applying the hot liquid adhesive directly to the rotating pre-fabricated thermoplastic paint roller core immediately prior to the placement of the fabric strip on the pre-fabricated thermoplastic paint roller core in an amount sufficient to securely bond the fabric strip to the pre-fabricated thermoplastic paint roller core so as to yield a structurally integral product, and wrapping the fabric while the thermoplastic adhesive is in hot liquid adhesive condition about the pre-fabricated thermoplastic paint roller core while the fabric and the pre-fabricated thermoplastic paint roller core are rotating with respect to each other.

3. The method of claim 2,
wherein the adhesive is selected from the group consisting of: polypropylene, polyethylene, a mixture of polypropylene and polyethylene having a polypropylene:polyethylene ratio of about 80:20, polyamide, polyolefin based compounds, polyester based compounds and polyurethane based compounds.

4. The method of claim 2,
wherein the plastic for fabricating the pre-fabricated thermoplastic paint roller core is selected from the following: polypropylene, polyethylene, polyester, and a mixture of polyethylene and polypropylene.

* * * * *